United States Patent
Poole et al.

(10) Patent No.: US 12,437,330 B2
(45) Date of Patent: *Oct. 7, 2025

(54) SYSTEMS AND METHODS FOR LOCATION SENSING TO FACILITATE BEST PRICING OPTIONS

(71) Applicant: CAPITAL ONE SERVICES, LLC, McLean, VA (US)

(72) Inventors: Thomas Poole, Chantilly, VA (US); Kaleen Love, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,000

(22) Filed: Apr. 1, 2024

(65) Prior Publication Data
US 2024/0249343 A1 Jul. 25, 2024

Related U.S. Application Data

(63) Continuation of application No. 17/850,384, filed on Jun. 27, 2022, now Pat. No. 12,020,308, which is a continuation of application No. 16/951,640, filed on Nov. 18, 2020, now Pat. No. 11,403,695, which is a continuation of application No. 14/729,874, filed on Jun. 3, 2015, now Pat. No. 10,867,341.

(60) Provisional application No. 62/007,584, filed on Jun. 4, 2014.

(51) Int. Cl.
G06Q 30/0601 (2023.01)
G06Q 30/0207 (2023.01)

(52) U.S. Cl.
CPC ..... *G06Q 30/0633* (2013.01); *G06Q 30/0224* (2013.01); *G06Q 30/0639* (2013.01)

(58) Field of Classification Search
CPC ...... G06Q 30/0625; G06F 30/20; G01S 5/019
See application file for complete search history.

(56) References Cited

U.S. PATENT DOCUMENTS

| | | | |
|---|---|---|---|
| 2010/0245076 A1* | 9/2010 | Jo | G01C 21/206 707/769 |
| 2013/0091452 A1* | 4/2013 | Sorden | G06F 30/20 715/771 |
| 2014/0207615 A1* | 7/2014 | Li | G06Q 30/0623 705/26.61 |
| 2014/0365336 A1* | 12/2014 | Hurewitz | G06Q 30/0625 705/26.62 |
| 2015/0087332 A1* | 3/2015 | Pijl | G01S 5/019 455/456.1 |

* cited by examiner

*Primary Examiner* — Saba Dagnew
(74) *Attorney, Agent, or Firm* — FOLEY & LARDNER LLP

(57) ABSTRACT

Systems and methods are provided for purchasing merchandise items at a desired purchase price. In accordance with certain embodiments, systems and methods are provided for specifying a desired purchase price for a merchandise item. Embodiments of the present disclosure may also provide systems and methods for completing purchases of the merchandise item when the purchase price of the merchandise item is less than or equal to the desired purchase price. Other embodiments of the present disclosure may also provide systems and methods to determine and/or adjust the purchase price for a merchandise item and notify the customer when the adjusted purchase price is less than or equal to the desired purchase price.

20 Claims, 9 Drawing Sheets

SYSTEMS AND METHODS FOR LOCATION SENSING TO FACILITATE BEST PRICING OPTIONS

CROSS-REFERENCE TO RELATED APPLICATIONS

This application is a continuation of U.S. patent application Ser. No. 17/850,384, filed Jun. 27, 2022, which is a continuation of U.S. patent application Ser. No. 16/951,640, filed Nov. 18, 2020, now U.S. Pat. No. 11,403,695 issued Aug. 2, 2022, which is a continuation of U.S. patent application Ser. No. 14/729,874, filed Jun. 3, 2015, now U.S. Pat. No. 10,867,341 issued Dec. 15, 2020, which claims priority from U.S. Provisional Patent Application No. 62/007,584, filed Jun. 4, 2014. The content of the foregoing applications is incorporated herein in its entireties by reference.

BACKGROUND INFORMATION

Customers often walk through their favorite store, see merchandise items that they want to purchase, but ultimately decide not to purchase the merchandise items because the advertised purchase price exceeds what the customers want to pay for that merchandise item. Furthermore, even if the price of that merchandise item later decreases, the customer may not return to the store to purchase that item because the customer either does not know about the price reduction or because it is inconvenient for the customer to return to the store to purchase the merchandise item.

The ubiquity and ease of online shopping exacerbates this situation. For example, customers may walk into a brick and mortar store, look at a merchandise item, but then decide to order the item online upon finding the item available at a lower price online. Customers may also do so because online ordering provides the customer with the convenience of receiving the items directly at a desired address. Online ordering also allows the customer to conveniently ship the same or different items to one or more addresses.

In view of the above deficiencies, among others, there exists a need for improved systems and methods for providing customers with a fast and convenient, no hassle process to specify a desired purchase price for merchandise items and to purchase merchandise items at the desired purchase price. Further, there exists a need for improved systems and methods for conveniently delivering the purchased items to one or more destinations identified by the customer. Such improved systems and methods have the potential to dramatically increase sales by creating a no hassle process that enables customers to conveniently purchase merchandise items at a desired purchase price.

SUMMARY

In accordance with the present disclosure, systems and methods are provided for purchasing merchandise items at a desired purchase price. In accordance with certain embodiments, systems and methods are provided for specifying a desired purchase price for a merchandise item. Embodiments of the present disclosure may also provide systems and methods for completing purchases of the merchandise item when the purchase price of the merchandise item is less than or equal to the desired purchase price. Other embodiments of the present disclosure may also provide systems and methods to determine and/or adjust the purchase price for a merchandise item and notify the customer when the adjusted purchase price is less than or equal to the desired purchase price.

In accordance with one exemplary embodiment, a computer-implemented method is disclosed for facilitating the purchase of a merchandise item. By way of example, the method comprises determining, using at least one sensor, a location of a customer device in the store, identifying, using a processor, at least one merchandise item located adjacent to the customer device, displaying a list of the identified merchandise items, receiving a selection of a merchandise item from the list, identifying a purchase price for the selected merchandise item, receiving a desired purchase price lower than the purchase price, and storing in a memory device the desired purchase price in association with the merchandise item.

In accordance with another exemplary embodiment, a computer-implemented method is disclosed for sale of a merchandise item. By way of example, the method comprises retrieving a list of merchandise items associated with a customer, selecting a merchandise item from the list, determining a purchase price for the selected merchandise item, determining a desired purchase price associated with the customer for the selected merchandise item, and sending, to a device associated with the customer, a notification when the purchase price is less than or equal to the desired purchase price.

In accordance with another exemplary embodiment, a purchase assistance system is disclosed. By way of example the system comprises a plurality of sensors located in the store, a database storing a position of each of the plurality of sensors, and for each of the plurality of sensors, information indicating merchandise items located within a predetermined distance of the position, a memory storing instructions, and at least one processor configured to execute the instructions to perform operations comprising receiving a signal indicating a position of a customer device in the store, identifying at least one sensor adjacent to the position of the customer device, determining a list of merchandise items located within the predetermined distance from the at least one sensor, receiving, from the customer device, a selection of a merchandise items from the list, receiving, from the customer device, a desired purchase price lower than the purchase price, and storing the desired purchase price in association with the merchandise item.

In accordance with another exemplary embodiment, a non-transitory computer-readable medium storing instructions for purchase assistance at a store. The instructions, when executed by a processor, cause the computer to perform the steps of determining a location of a customer device in the store, identifying merchandise items located adjacent to the customer device, displaying a list of the identified merchandise items, receiving a selection of a merchandise item from the list, identifying a purchase price for the selected merchandise item, receiving a desired purchase price lower than the purchase price, and storing the desired purchase price in association with the merchandise item.

Additional objects and advantages of the embodiments of the present disclosure will be set forth in part in the description which follows, and in part will be obvious from the description, or may be learned by practice of the embodiments of the present disclosure.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this present disclosure, illustrate disclosed embodiments of the present disclosure and, together with the description, serve to explain the principles of the present disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts. The disclosed embodiments include methods and systems configured to provide, for example, convenient selection and purchase of merchandise items by a customer in a store.

Figure 1:
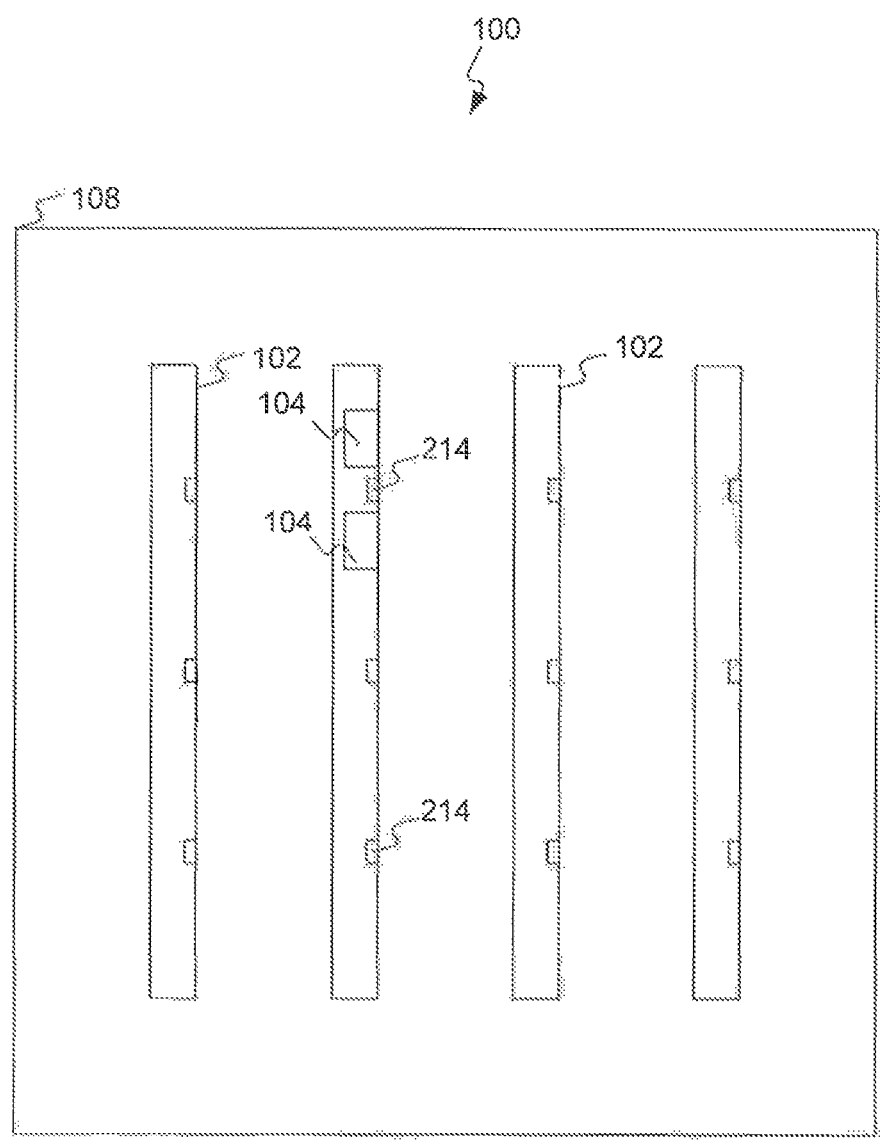
FIG. 1 shows an exemplary store consistent with disclosed embodiments.

FIG. 1 shows a block diagram of an exemplary store 100 for implementing embodiments and features of the present disclosure. As shown in FIG. 1, in one exemplary embodiment, store 100 may include one or more aisles 102, which may be equipped with racks or other equipment well-known in the art for storing merchandise items 104. Aisles 102 may also be equipped with one or more sensors 214, which may be configured to detect the position of one or more customer devices being carried by one or more customers, when the customer devices are located near to or adjacent to sensors 214. In some exemplary embodiments, a position of sensors 214 or a position of the customer device in the vicinity of sensors 214 may be determined based on distances from a known location in store 100, for example, from corner 108. In certain embodiments, sensors 214 may also be configured to store and transmit information regarding a position or location of sensors 214 (e.g., aisle 4, section 2) or of the detected customer device (e.g., using locational information provided by the device).

Figure 2:
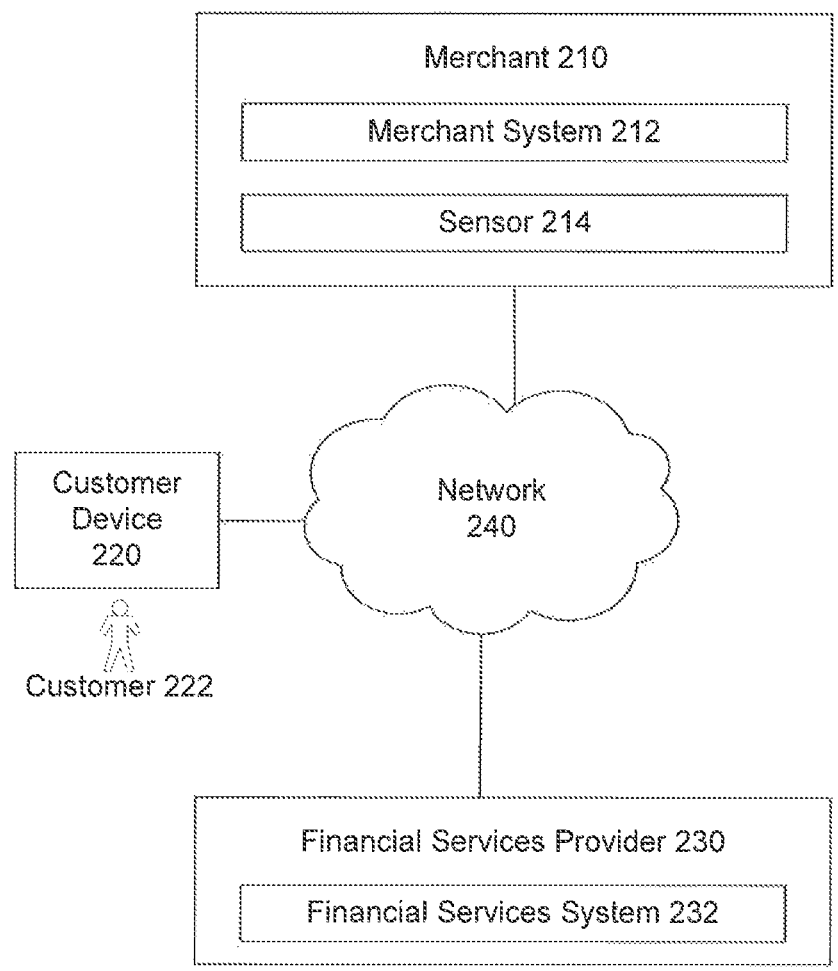
FIG. 2 shows an exemplary system consistent with disclosed embodiments.

FIG. 2 shows a block diagram of an exemplary system 200 for implementing embodiments and features of the present disclosure. The arrangement and number of components in system 200 is provided for purposes of illustration. Additional arrangements, number of components, and other modifications may be made, consistent with the present disclosure.

As shown in FIG. 2, in one embodiment, system 200 may include merchant 210, customer device 220, financial services provider 230, and network 240. Merchant 210 may be an entity that offers goods, services, and/or information, such as a retailer (e.g., Macy's®, Target®, etc.), grocery store, service provider (e.g., utility company, etc.), or any other type of entity that offers goods, services, and/or information that consumers (e.g., end-users or other business entities, such as customer 222) may purchase, consume, use, etc. Merchant 220 may offer for sale one or more products. In one example, merchant 210 may be associated with brick and mortar location(s) that a consumer 222 may physically visit and purchase a product or service. Merchant 210 may also include back- and/or front-end computing components that store data and execute software instructions to perform operations consistent with disclosed embodiments, such as computers that are operated by employees of the merchant (e.g., back office systems, etc.).

Merchant 210 may include merchant system 212 and one or more sensors 214. Merchant system 212 may include point-of-sale terminals, tablets, personal digital assistants, personal computers, laptop computers, desktop computers, smartphones, netbooks and/or other types of electronics or communication devices. In some exemplary embodiments, merchant system 212 may be configured to facilitate and/or perform transactions, for example, sale of one or more merchandise items 104 to one or more customers 222 in store 100.

In other exemplary embodiments, merchant system 212 may include one or more servers or other type of computer devices configured to execute software instructions stored in memory to perform one or more processes consistent with the disclosed embodiments. For example, merchant system 212 may include one or more memory device(s) storing data and software instructions and one or more processor(s) configured to use the data and execute the software instructions to perform server-based functions and operations known to those skilled in the art. Merchant system 212 may include server(s) that are configured to execute stored software instructions to perform operations associated with merchant 210, including one or more processes associated with processing purchase transactions, generating transaction data, generating product data (e.g., SKU data) relating to purchase transactions, etc.

Merchant system 212 may include one or more servers that may be general purpose computers, mainframe computers, or any combination of these components. In certain embodiments, merchant system 212 (or a system including merchant system 212) may be configured as a particular apparatus, system, and the like based on the storage, execution, and/or implementation of the software instructions that perform one or more operations consistent with the disclosed embodiments. A merchant server may be standalone, or it may be part of a subsystem, which may be part of a larger system. For example, a merchant server may represent distributed servers that are remotely located and communicate over a network (e.g., network 240) or a dedicated network, such as a LAN. In certain aspects, merchant system 212 may include one or more web servers that execute software that generates, maintains, and provides web site(s) for a respective merchant 210 that is accessible over network 240. In other aspects, a merchant system 212 may connect separately to web server(s) or similar computing devices that generate, maintain, and provide web site(s) for a merchant.

Merchant 210 may include one or more sensors 214 to detect and/or communicate with the presence of a customer device in the vicinity of sensor 214. By way of example, sensor 214 may include a Bluetooth low energy beacon, a radio frequency identification (RFID) tag, a wireless sensor, an electromagnetic wave transmitter and receiver pair, and/or any other type of device configured to detect the presence of a customer device. For the purposes of this disclosure the location of customer device 220 may be presumed to reveal the location of customer 222 operating the device. In some exemplary embodiments, sensor(s) 214 may include one or more processor(s) configured to access data and/or execute software instructions stored in memory to perform one or more processes consistent with the disclosed embodiments. In some exemplary embodiments, sensor 214 may be operated by merchant 210 and may be configured to communicate to and/or through network 240 with other components, such as merchant system 212, customer device 220, and/or financial services system 232. In other exemplary embodiments, sensor(s) 214 may be operated by a third party (not shown) to merchant 210, such as a third-party contractor to provide services consistent with disclosed embodiments.

Each sensor 214 may have a sensor identifier associated with sensor 214. The sensor identifier may be numeric or alphanumeric and may be used by merchant system 212, customer device 220, and/or financial services system 232 to identify and/or locate sensor 214. In some exemplary embodiments, the sensor identifier may be a Bluetooth identifier corresponding to sensor 214. In other exemplary embodiments, sensor identifier may include a Bluetooth profile associated with sensors 214. In yet other exemplary embodiments, sensor identifier may include a coordinate position of sensors 214 in store 100 relative to, for example, corner 108 (see FIG. 1).

Customer 222 may be a customer or potential customer to merchant 210. Customer 222 may operate customer device 220 to communicate to and/or through network 240 with other components, such as sensor 214, merchant system 212, and/or financial services system 232. By way of example, customer device 220 may include customer devices such as smartphones, tablets, netbooks, electronic readers, electronic glasses, smart watches, personal digital assistants, personal computers, laptop computers, pair of multifunctional glasses, tracking device, and/or other types of electronics or communication devices. In some exemplary embodiments, customer device 220 may be configured to execute a customer assistance application, which may be configured to assist a customer locate in-store merchandise items 104, communicate with sensor 214, and/or facilitate or perform transactions (e.g., the selection and purchase of one or more merchandise items 104 in store 100). In some exemplary embodiments, customer device 220 may also allow customer 222 to access inventory and other merchandise information stored by merchant 210 and/or other components of system 200.

For example, one or more customers 222 may use customer device 220 while shopping for merchandise items in store 100. In one exemplary embodiment sensor 214 may detect the presence of customer device 220, when customer device 220 is in the vicinity of sensor 214. Sensor 214 may transmit information regarding merchandise items 104 stored near customer device 220. The information regarding merchandise items 104 may be displayed to customer 222 on a display of customer device 220. Customer 222 may select, for example, using customer device 220, one or more merchandise items 104 from the displayed merchandise items 104 for purchase. Customer device 220 may communicate to and/or through network 240 with merchant system 212 and financial services system 232, for example, to allow customers 222 to complete purchase of the selected merchandise items 104, without customers 222 having to take any merchandise items 104 to a checkout counter and/or having to wait in line at the checkout counter to complete purchase of the merchandise items 104.

System 200 may also include financial services provider 230 which may include financial services system 232. Financial service provider 230 may be an entity that provides, maintains, manages, or otherwise offers financial services. For example, financial service provider 230 may be a bank, credit card issuer, or any other type of financial service entity that generates, provides, manages, and/or maintains financial service accounts for one or more users. Financial service accounts may include, for example, credit card accounts, loan accounts, checking accounts, savings accounts, reward or loyalty program accounts, and/or any other type of financial service account known to those skilled in the art. Financial services provider 230 may include financial services system 232. Financial services system 232 may include infrastructure and components that are configured to generate and/or provide financial service accounts such as credit card accounts, checking accounts, debit card accounts, loyalty or reward programs, lines of credit, and the like. Consistent with certain disclosed embodiments, financial service provider 230, using financial service provider system 232, may provide manufacturer-based financial service accounts, which may be financial service accounts that are associated with a manufacturer of products or services. For example, financial service provider 230 may provide financial services for a credit card account that is branded by an entity, such as a private label credit card branded by a product manufacturer.

By way of example, financial services system 232 may include front and/or backend servers, tablets, personal digital assistants, personal computers, laptop computers, desktop computers, smartphones, netbooks and/or other types of electronics or communication devices. In one exemplary embodiment, financial services system 232 may include one or more servers or other type of computer devices configured to execute software instructions stored in memory to perform one or more processes consistent with the disclosed embodiments. For example, financial services system 232 may include one or more memory device(s) storing data and software instructions and one or more processor(s) configured to use the data and execute the software instructions to perform server-based functions and operations known to those skilled in the art. Financial services system 232 may include server(s) that are configured to execute stored software instructions to perform operations associated with financial services provider 230, including one or more financial transactions, for example, authentication of financial information associated with customers 222 and/or payment for the purchase and/or authorization requests associated with the purchase of merchandise items 104 by one or more customers 222 in store 100. Financial services system 232 may be operated by one or more financial services providers 230 to communicate to and/or through network 240 with other components, such as merchant system 212, sensor 214, and/or customer device 220.

System 200 may also include network 240 which may facilitate communications between merchant system 212, sensor 214, customer device 220, and/or financial services system 232. In some exemplary embodiments, network 240 may include any combination of communications networks. For example, network 240 may include the Internet and/or any type of wide area network, an intranet, a metropolitan area network, a local area network (LAN), a wireless network, a cellular communications network, a Bluetooth network, or any other type of electronics communications network, etc.

The components and arrangement of the components included in system 200 may vary. Thus, system 200 may further include other components that perform or assist in the performance of one or more processes consistent with the disclosed embodiments. Further, system 200 may include any number of merchants 210, merchant systems 212, sensors 214, customer devices 220, customers 222, financial services providers 240, and/or financial services systems 242. In some exemplary embodiments, merchant 210, customers 222, and/or financial services provider 230 may employ merchant system 212, customer device 220, and/or financial services system 232 to perform one or more functions. Although exemplary functions may be described as performed by a particular component of system 200 for ease of discussion, some or all disclosed functions of that particular component may interchangeably be performed by one or more of merchant system 212, sensors 214, customer device 220, and/or financial services system 232.

Figure 3:
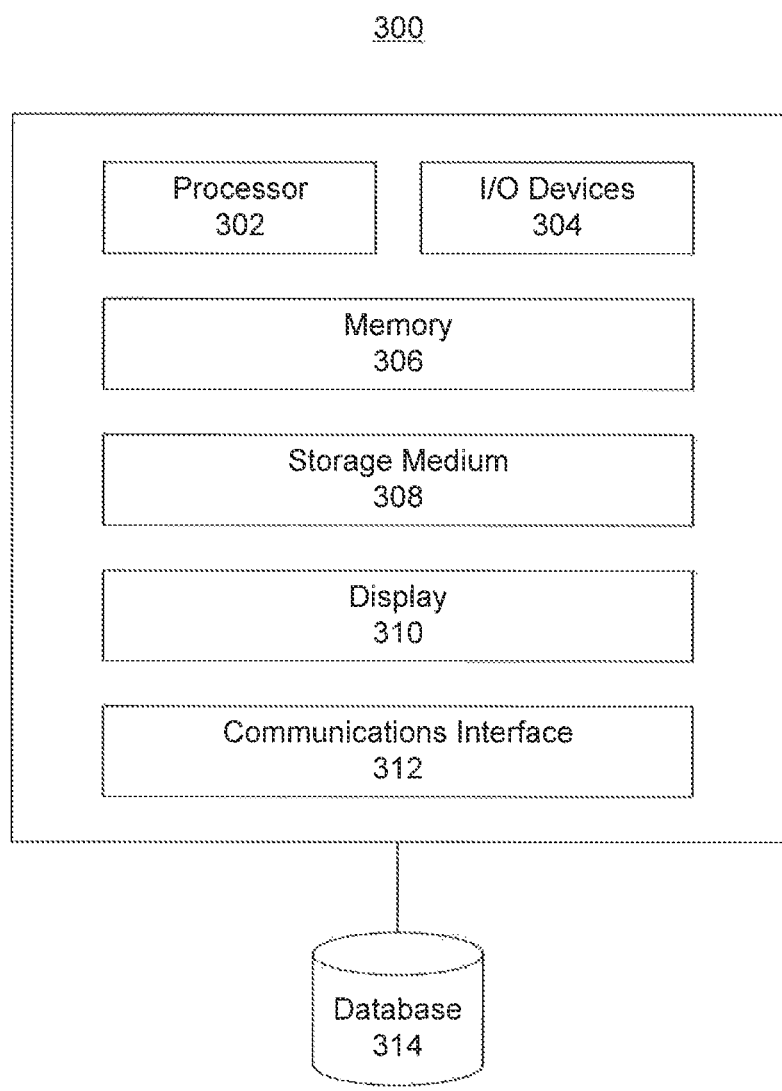
FIG. 3 shows a block diagram of another exemplary system consistent with disclosed embodiments.

FIG. 3 illustrates an exemplary system 300 for implementing embodiments and features of the present disclosure. By way of example, system 300 or similar computing devices may be used to implement merchant system 212, sensor 214, customer device 220, and/or financial services system 232. The arrangement and number of components in system 300 are provided for purposes of illustration. Additional arrangements, number of components, and other modifications may be made, consistent with the present disclosure.

System 300 may include one or more processors 302 for executing instructions. System 300 may also include one or more input/output (I/O) devices 304. By way of example, I/O devices 304 may include physical keyboards, virtual touch-screen keyboards, mice, joysticks, styluses, etc. In certain exemplary embodiments, I/O devices 304 may include a microphone (not shown) for providing input to system 300 using, for example, voice recognition, speech-to-text, and/or voice command applications. In other exemplary embodiments, I/O devices 304 may include a telephone keypad and/or a keypad on a touch-screen for providing input to system 300. In yet another exemplary embodiments, input may be provided to system 300 in the form of spoken information provided by customer 222 to a customer services representative or an operator associated with system 300.

As further illustrated in FIG. 3, system 300 may include memory 306 configured to store data or one or more instructions and/or software programs that perform functions or operations when executed by the one or more processors 302. By way of example, memory 306 may include Random Access Memory (RAM) devices, NOR or NAND flash memory devices, Read Only Memory (ROM) devices, etc. System 300 may also include storage medium 306 configured to store data or one or more instructions and/or software programs that perform functions or operations when executed by the one or more processors 302. By way of example, storage medium 308 may include hard drives, solid state drives, tape drives, RAID arrays, compact discs (CDs), digital video discs (DVDs), Blu-ray discs (BD), etc. Although FIG. 3 shows only one memory 306 and one storage medium 308, system 300 may include any number of memories 306 and storage mediums 308. Further, although FIG. 3 shows memory 306 and storage medium 308 as part of system 300, memory 306 and/or storage medium 308 may be located remotely and system 300 may be able to access memory 306 and/or storage medium 308 via network 240.

System 300 may also include one or more displays 310 for displaying data and information. Display 310 may be implemented using devices or technology, such as a cathode ray tube (CRT) display, a liquid crystal display (LCD), a plasma display, a light emitting diode (LED) display, a touch screen type display, a projection system, and/or any other type of display known in the art.

System 300 may also include one or more communications interfaces 312. Communications interface 312 may allow software and/or data to be transferred between system 300, merchant system 212, sensor 214, customer device 220, financial services system 232, network 240, and/or other components. Examples of communications interface 312 may include a modem, a network interface (e.g., an Ethernet card or a wireless network card), a communications port, a PCMCIA slot and card, a cellular network card, etc. Communications interface 312 may transfer software and/or data in the form of signals, which may be electronic, electromagnetic, optical, or other signals capable of being transmitted and received by communications interface 312. Communications interface 312 may transmit or receive these signals using wire, cable, fiber optics, radio frequency ("RF") link, Bluetooth link, and/or other communications channels.

System 300 may also include one or more databases 314. Database 314 may include one or more logically and/or physically separate databases configured to store data. The data stored in database 314 may be received from merchant system 212, from sensor 214, from customer device 220, from financial services system 232, and/or may be provided as input using conventional methods (e.g., data entry, data transfer, data uploading, etc.). The data stored in database 314 may include customer and sensor position data, sensor identifiers, merchandise identifiers, customer profiles, customer credentials, customer credit history, customer transaction history, information related to inventory and location of merchandise items in store 100, information related to one or more items purchased or selected for purchase by one or more customers 222, financial information related to one or more financial accounts, and/or other financial data associated with one or more customers 222, etc. Additionally or alternatively, the data stored in the database 314 may take or represent various forms including, but not limited to, documents, presentations, spreadsheets, textual content, mapping and geographic information, rating and review information, pricing information, address information, profile information, information regarding sensor 214 or merchandise items 104, audio files, video files, and a variety of other electronic data, or any combination thereof.

In some embodiments, database 314 may be implemented using a single computer-readable storage medium. In other embodiments, database 314 may be maintained in a network attached storage device, in a storage area network, or combinations thereof, etc. Furthermore, database 314 may be maintained and queried using numerous types of database software and programming languages, for example, SQL, MySQL, IBM DB2®, Microsoft Access®, PERL, C/C++, Java®, etc.

Figure 4:
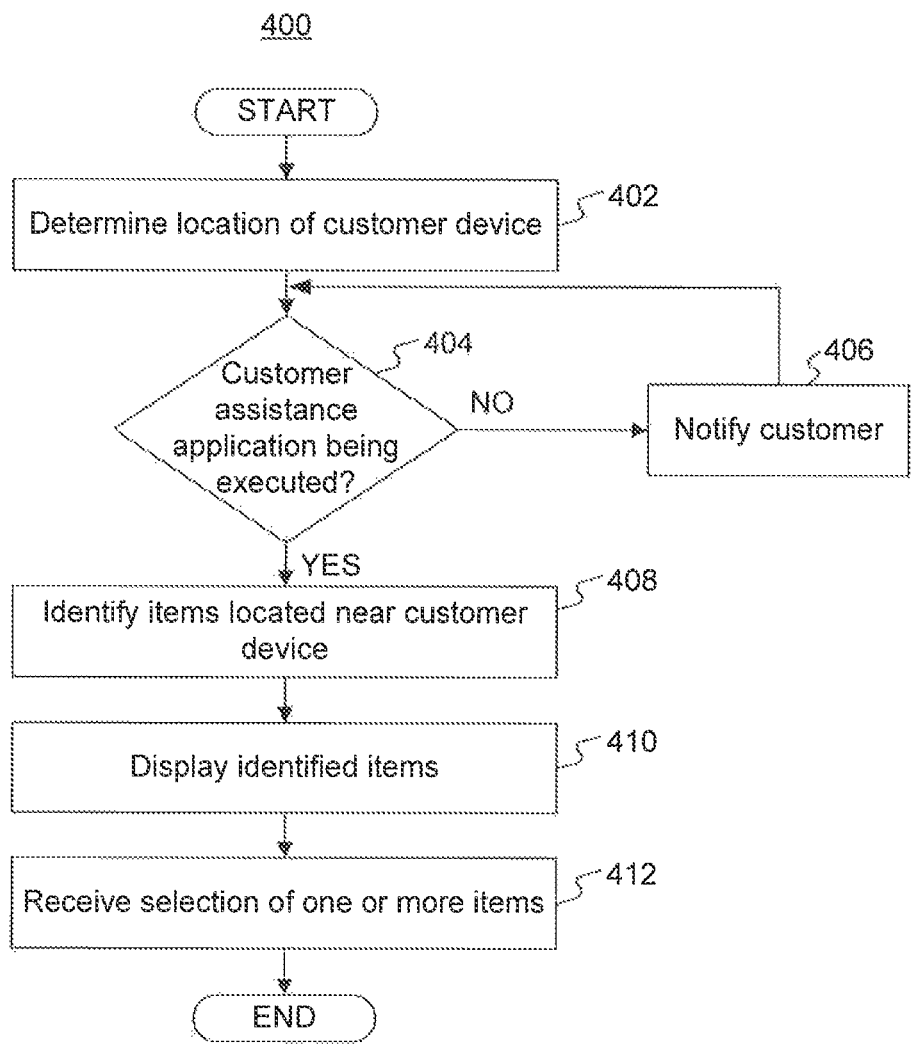
FIG. 4 shows an exemplary process of assisting a customer with purchase of a merchandise item in a store consistent with disclosed embodiments.

FIG. 4 is a flowchart of an exemplary process 400 for assisting one or more customers 222 during a visit to a store 100 associated with, for example, merchant 210. Process 400 may be implemented, for example, on customer device 220 and/or merchant system 212 with or without communications via network 240. The order and arrangement of steps in process 400 is provided for purposes of illustration. As will be appreciated from this disclosure, modifications may be made to process 400 by, for example, adding, combining, removing, and/or rearranging one or more steps of process 400. It is contemplated that in performing process 400, notifications, information, message, images, graphical user interface, etc. may be displayed to customers 222, on display 310 associated with customer device 220 or on a display 310 located near a location of customer device 220 in store 100. Further, it is contemplated that in performing process 400, customers 222 may make one or more selections from a GUI displayed on display 310 or enter one or more items of information or data using I/O devices 304 associated with customer device 220. In addition it is contemplated that in performing process 400, information or data may be accessed, retrieved, or stored in memory 306, storage medium 308, and/or database 314 associated with one or more of sensor 214, customer device 220, merchant system 212, and/or financial services system 232.

As shown in FIG. 4, process 400 may include a step 402 of determining a location of customer device 220 in store 100. A location of customer device 220 in store 100 may be determined in many ways. In one exemplary embodiment, customer device 220 may transmit a signal, which may be received by sensor 214. The signal transmitted by customer device 220 may be a near-field signal, for example, a Bluetooth signal or an RFID signal, which may be receivable only by sensors 214 located in the vicinity of customer device 220. A location of customer device 220 may be determined as a location of the sensor 214 that detects the near-field signal transmitted by customer device 220. As used in this disclosure, sensors 214 may be determined as being located in the vicinity of customer device 220 when sensors 214 are positioned near customer device 220 at a threshold distance from a position of customer device 220. In one exemplary embodiment, the threshold distance may be of the order of a few inches, for example, 2 to 5 inches. In another exemplary embodiment, the threshold distance may be half the distance between sensor(s) 214.

In another exemplary embodiment, customer device 220 may receive signals from one or more sensors 214. Customer device 220 may extract information regarding sensors 214 from the received signals. In some exemplary embodiments, the information contained in signals transmitted by sensors 214 may include a Bluetooth identifier, Bluetooth profile, sensor identifier, and/or sensor position. The sensor identifier of each sensor 214 may be stored in association with a known position of sensor 214 in memory 306, storage medium 308, and/or database 314. Customer device 220 may retrieve a position or sensor identifier of sensor 214 located near customer device 220 based on the stored information. In another exemplary embodiment, customer device 220 may transmit some or all of the extracted information to merchant system 212 through network 240. Merchant system 212, may retrieve a position or sensor identifier of sensor 214 located near customer device 220 based on information stored in memory 306, storage medium 308, and/or database 314 and transmit the position or sensor identifier to customer device 220 through network 240.

In yet another exemplary embodiment, each sensor 214 may include a transmitter and a receiver. A signal may be continuously transmitted by each transmitter and received by its corresponding receiver. Presence of customer 222 and/or customer device 220 near sensor 214 may interrupt the signal from being transmitted by a transmitter associated with sensor 214 or from being received by a corresponding receiver associated with sensor 214. Interruption of the transmission or reception of the signal may be used to identify sensor 214 located near customer 222 and/or customer device 220.

In yet other exemplary embodiment, customer device 220 may receive signals transmitted by one or more sensors 214. Customer device 220 may determine a strength of each received signal. Customer device 220 may combine the signal strengths with known positions of sensors 214 to determine the location of customer device 220 in store 100 using triangulation techniques well-known in the art.

The location of customer device 220 in store 100 may include a co-ordinate position based on a fixed reference point in store 100. For example, the location of customer device 220 in store 100 may be expressed as a distance along two directions as measured from corner 108 of store 100 (see FIG. 1). In other exemplary embodiments, the location of customer device 220 in store 100 may include an identifier corresponding to an aisle 102 (see FIG. 1) in which customer 222 may be present in store 100. In yet other exemplary embodiments, the location of customer device 220 in store 100 may include a coordinate position or a sensor identifier of sensor 214 located near customer device 220.

As further illustrated in FIG. 4, process 400 may include a step 404 of determining whether a customer assistance application is running on customer device 220. Customer assistance application may be configured to assist customer 222 in locating merchandise items 104 near customer 222 in store 100 and in selecting and purchasing one or more merchandise items 104. In some exemplary embodiments, customer assistance application may be provided to customer 222 by merchant 210. In other exemplary embodiments, customer 222 may have the option of downloading and installing customer assistance application on customer device 220 from merchant system 212, financial services system 232, or another website or communications resource. In other exemplary embodiments, merchant 210 may provide customer 222 with customer device 220, which may include the customer assistance application.

When it is determined in step 404 that customer assistance application is being executed on customer device 220 (Step 404: YES), process 400 may proceed to step 408. When it is determined in step 404, however, that customer assistance application is not being executed on customer device 220 (Step 404: NO), process 400 may proceed to step 406 of notifying customer 222 to start executing the customer assistance application.

In some exemplary embodiments, notifying customer 222 may include, sending customer 222 a text message, electronic mail, message using short message service (SMS), etc. In other exemplary embodiments, notifying customer 222 may include calling customer 222 or using voice mail to leave a message for customer 222. In yet other exemplary embodiments, notifying customer 222 may include displaying a message on display 310. After notifying customer 222, process 400 may return to step 404.

As further illustrated in FIG. 4, process 400 may include a step 408 of identifying merchandise items 104 located near customer 222. Merchandise items 14 located near customer device 222 may be identified in many ways. For example, sensor 214 may store a list of merchandise items 104 located near sensor 214 in memory 306, storage medium 308, and/or database 314. When sensor 214 detects that customer device 220 is near sensor 214, sensor 214 may retrieve the list of merchandise items 104 from memory 306, storage medium 308, and/or database 314 and transmit the list of merchandise items 104 to customer device 220.

In other exemplary embodiments, a distance of each merchandise item 104 from each sensor 214 may be determined in advance and stored in association with a sensor identifier or position of sensor 214 in memory 306, storage medium 308, and/or database 314. Distances of each merchandise item 104 from sensors 214 located near customer device 220 may be retrieved from memory 306, storage medium 308, and/or database 314 by one of sensor 214, customer device 220, or merchant system 212. Merchandise items 104 located at a distance less than or equal to a first distance may be identified as merchandise items 104 located near customer device 220 in store 100. In some exemplary embodiments, the first distance may range from about 2 ft. to 4 ft. When sensor 214 or merchant system 212 identify merchandise items 104 located within the first distance, sensor 214 or merchant system 212 may transmit the list of merchandise items 104 to customer device 220.

As further illustrated in FIG. 4, process 400 may include a step 410 of displaying merchandise items 104 identified as being located near customer device 220. The identified merchandise items 104 may be displayed on display 310 associated with customer device 220. Additionally or alternatively, the list of merchandise items 104 may be displayed on display 310 located adjacent to the sensor 214 located near customer device 220.

Figure 5:
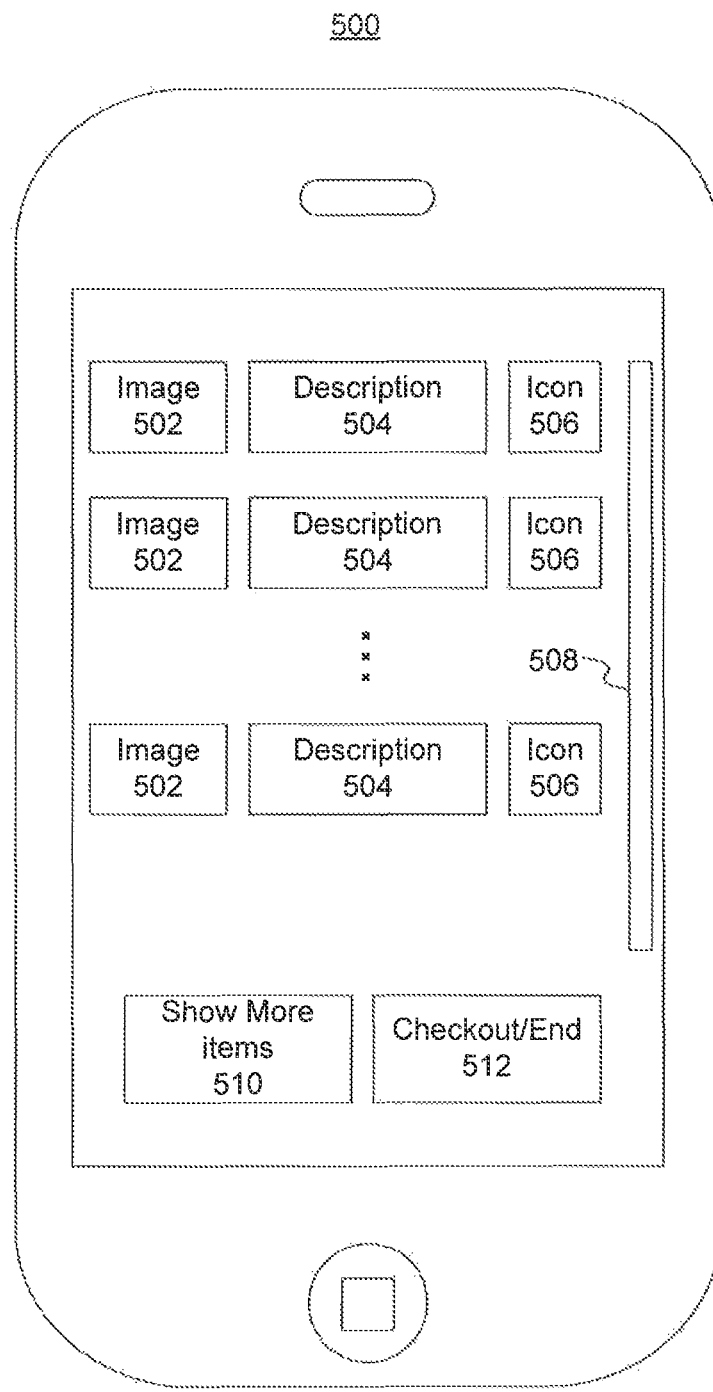
FIG. 5 shows an exemplary graphical user interface ("GUI") for assisting a customer with purchase of a merchandise item in a store consistent with disclosed embodiments.

FIG. 5 illustrates an exemplary GUI 500 for displaying merchandise items 104 located near customer device 220 on display 310. According to some embodiments, GUI 500 may be displayed on customer device 220. As illustrated in FIG. 5, each identified merchandise item 104 may be displayed on a separate line on GUI 500. Each line may include image 502, description 504, and icon 506 corresponding to merchandise item 104. Image 502 may include, for example, a thumbnail image of merchandise item 502. In some exemplary embodiments, customer 222 may be able to manipulate the thumbnail image using one or more I/O devices 304. For example, customer 222 may be able to magnify the thumbnail image 502 of merchandise item 104 by, for example, clicking on, tapping, or selecting image 502 of GUI 500, using one or more I/O devices 304. Customer 222 may also be able to shrink and/or rotate the magnified image of merchandise item 104.

GUI 500 may include description 504, which may include a brief textual description of merchandise item 104. GUI 500 may also include icon 506, which may include texts or symbols asking customer 222 to make a selection for purchasing merchandise item 104. GUI 500 may also include a scroll-bar 508, which may allow customer 222 to scroll the displayed list of merchandise items 104 up or down to view additional merchandise items 104 not visible on display 310. One or more of GUI elements 502, 504, 506, 508, 510, 512 may be selected to provide more information regarding merchandise items 104, to select merchandise item 104 for purchase, or to take other actions as described in this disclosure. GUI 500 may also include GUI element 510 which may allow customer 222 to request customer device 220 to show more merchandise items 104 located near customer device 220.

In some exemplary embodiments, when customer 222 selects GUI element 510 to request identification and/or display of additional merchandise items 104, merchandise items 104 located at a distance less than or equal to a second distance from customer device 220 and/or sensor 214 may be identified as merchandise items 104 located near customer device 220 and displayed to customer 222. The second distance may be obtained by increasing the first distance by a third distance. In some exemplary embodiments, the third distance may range from 2 to 4 ft. In other exemplary embodiments, when customer 222 requests identification and/or display of additional merchandise items 104, merchandise items 104 located in an entire aisle 102 of store 100 near which customer device 220 may be located may be identified and displayed to customer 222.

GUI 500 may also include GUI element 512, which may allow customer 222 to indicate that customer 222 has finished evaluating and/or selecting for purchase merchandise items 104 displayed in GUI 500. In some exemplary embodiments, GUI element 512 may also allow customer 222 to indicate that customer 222 wishes to initiate a checkout process to purchase selected merchandise items 104.

Although GUI elements, 506 has been referred to as an icon in the above description, it is contemplated that element 506 may be a button, a universal resource locator (URL), or any other GUI element well-known in the art for displaying an image and receiving input. Similarly, GUI elements 510, 512 may be any one of a button, a URL, a checkbox, a radio button, or any other GUI element well-known in the art. Although certain specific GUI elements have been discussed above, GUI 500 may include additional GUI elements, for example, windows, menus, drop-down lists, sliders, controls, text boxes, check boxes, radio buttons, scroll bars, or any other GUI elements well-known in the art. Customer 222 may manipulate, select, or provide input by clicking, tapping, manipulating, and/or entering data in one or more GUI elements of GUI 500 using one or more I/O devices 304.

Returning to FIG. 4, process 400 may include a step 412 of receiving an indication that customer 222 wants to purchase one or more merchandise items 104. Customer 222 may select one or more merchandise items 104 for purchase by selecting, for example, icon 506 (see FIG. 5) corresponding to merchandise items 104 using one or more I/O devices 304. Additional details regarding selecting merchandise items 104 are discussed below in connection with process 600.

Figure 6:
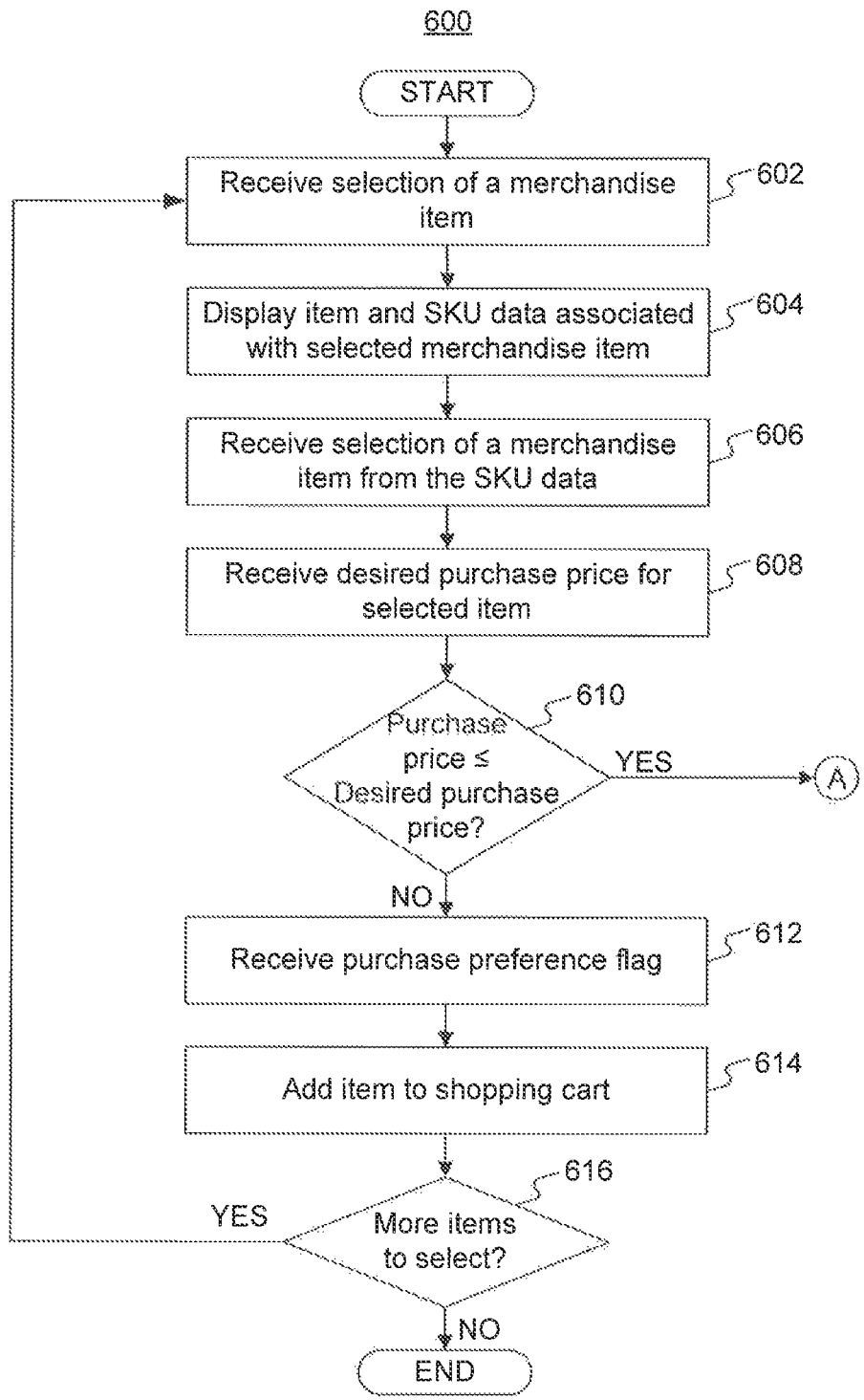
FIG. 6 shows an exemplary process of selecting one or more merchandise items for purchase from a store consistent with disclosed embodiments.

FIG. 6 is a flowchart of an exemplary process 600 that may be implemented for receiving selection of items for purchase from one or more customers 222. Process 600 may be implemented on customer device 220 with or without communications via network 240. The order and arrangement of steps in process 600 is provided for purposes of illustration. As will be appreciated from this disclosure, modifications may be made to process 600 by, for example, adding, combining, removing, and/or rearranging one or more steps of process 600. It is contemplated that in performing process 600, notifications, information, message, images, GUI, etc. may be displayed to customers 222 on display 310 associated with customer device 220. Further, it is contemplated that in performing process 600, customers 222 may make one or more selections or enter one or more items of information or data using I/O devices 304 associated with customer device 220. In addition it is contemplated that in performing process 600, information or data may be accessed, retrieved, or stored in memory 306, storage medium 308, and/or database 314 associated with one or more of merchant system 212, sensor 214, customer device 220, and/or financial services system 232.

As shown in FIG. 6, process 600 may include a step 602 of receiving an indication that customer 222 wants to purchase merchandise item 104. For example, customer device 220 may receive such an indication when customer 222 selects one or more merchandise items 104 displayed on GUI 500 for purchase using one or more I/O devices 304 to manipulate icon 506 (see FIG. 5).

As further illustrated in FIG. 6, process 600 may include step 604 of displaying merchandise item 104 and Stock Keeping Unit ("SKU") data associated with selected merchandise item 104. Merchandise item 104 and SKU data may be displayed on display 310 by performing processes similar to those discussed above in connection with, for example, step 410 of process 400. SKU data may provide information including, for example, sizes, colors, designs, patterns, accessories, and/or options, etc. that may be associated with merchandise item 104 that is reflected in a SKU number uniquely identifying the merchandise item 104. In some exemplary embodiments, customer 222 may be able to select one or more merchandise items 104 corresponding to the SKU data. Display of the selected merchandise items 104 may include other information, for example, whether merchandise items 104 corresponding to the SKU data are available at first store 100 or at second store 100 associated with first store 100. Display of the SKU data may also include information such as prices for merchandise items 104 corresponding to the SKU data. For example, when merchandise item 104 is a pair of shoes, colors of the shoes may constitute SKU data. Display of SKU data in this instance may include displaying images of the pair of shoes in a plurality of colors corresponding to SKUs of the pair of shoes on display 310.

As further illustrated in FIG. 6, process 600 may include a step 606 of receiving an indication that customer 222 wants to purchase a merchandise item 104 from the displayed merchandise items 104 corresponding to the SKU data and other information. For example, customer device 220 may receive such an indication when customer 222 selects one or more merchandise items 104 using one or more I/O devices 304 and/or GUI elements 502, 506 as discussed in connection with, for example, step 406 of process 400. For example, customer 222 may be able to select one or more of the colors of a pair of shoes displayed on display 310 using one or more I/O devices 304. Customer 222 may also be able to specify a shoe size. Images corresponding to the selected color(s) and shoe size together with other information such as a price may be displayed on display 310.

As further illustrated in FIG. 6, process 600 may include a step 608 of receiving a desired purchase price for the selected merchandise item 104. In some exemplary embodiments, customer 222 may specify the desired purchase price using one or more I/O devices 304 to manipulate the one or more GUI elements discussed in connection with, for example, GUI 500. For example, customer 222 may enter a value of the desired purchase price, in any currency known in the art, into a text box of GUI 500. Alternatively, for example, customer 222 may manipulate a slider element in GUI 500 to set the desired purchase price of merchandise item 104. In some exemplary embodiments, customer 222 may be able to select a desired purchase price from a drop down menu or list box in GUI 500.

As further illustrated in FIG. 6, process 600 may include a step 610 of determining whether the purchase price of merchandise item 104 is less than or equal to the desired purchase price. When it is determined in step 610 that the purchase price is less than or equal to the desired purchase price (Step 610: YES), process 600 may proceed to step A, which is discussed below in more detail in connection with process 700. When it is determined in step 610, however, that the purchase price is greater than the desired purchase price (Step 610: NO), process 612 may proceed to step 612 of receiving a purchase preference flag. As used in this disclosure, purchase preference flag may indicate whether customer 222 would like to complete purchase of a merchandise item 104 immediately when the purchase price of the merchandise item 104 becomes less than or equal to the desired purchase price. Purchase preference flag may have a first value when customer 222 indicates that purchase of merchandise item 104 must be completed immediately when the purchase price of the merchandise item 104 becomes less than or equal to the desired purchase price. Alternatively, customer 222 may specify a second value for purchase preference flag to indicate that customer 222 should be notified when the purchase price of merchandise item equals or falls below the desired sales price. In some exemplary embodiments, the flag may be numeric or alphanumeric. Customer 222 may specify the purchase preference flag by accessing and manipulating one or more GUI elements discussed in connection with, for example, GUI 500.

As further illustrated in FIG. 6, process 600 may include a step 614 of adding the selected merchandise item 104 to a shopping cart. Adding merchandise item 104 to a shopping cart may include, for example, adding a merchandise identifier associated with selected merchandise item 104 to a list of merchandise identifiers corresponding to merchandise items 104 selected by customer 222. The list of merchandise items 104, the desired purchase price for each merchandise item 104, and the purchase preference flag for each merchandise item 104 may be stored in association with a merchandise identifier and a customer identifier for customer 222 in memory 306, storage media 308, and/or database 314. Merchandise identifier, as used in this disclosure, may consist of numeric or alphanumeric characters that uniquely identify a particular merchandise item 104. Customer identifier, as used in this disclosure, may include a name, nickname, username, a numeric or alphanumeric identifier, biometric information such as a finger print or retinal scan, or any other type of identifier known in the art to uniquely identify customer 222.

As further illustrated in FIG. 6, process 600 may include a step 616 of determining whether the customer wants to select additional merchandise items 104. In some embodiments, determining whether customer 222 intends to select additional items may include notifying customer 222 with a message asking customer 222 whether customer 222 desires to select additional merchandise items 104. Notifying customer 222 in step 616 may include performing processes similar to those discussed in connection with, for example, step 406 of process 400. In some exemplary embodiments, notifying customer 222 in step 608 may also include sending a message to customer 222 using the customer assistance application being executed on customer device 220 using, for example, in-application messaging. Customer 222 may use one or more I/O devices 304 and/or GUI elements discussed in connection with, for example, GUI 500 to indicate whether customer 222 desires to select more merchandise items 104.

When it is determined in step 616, that customer 222 wants to select additional merchandise items 104 (Step 616: YES), process 600 may return to step 602. When it is determined in step 616, however, that customer 222 does not want to select additional merchandise items 104 (Step 616: NO), process 600 may end.

Figure 7:
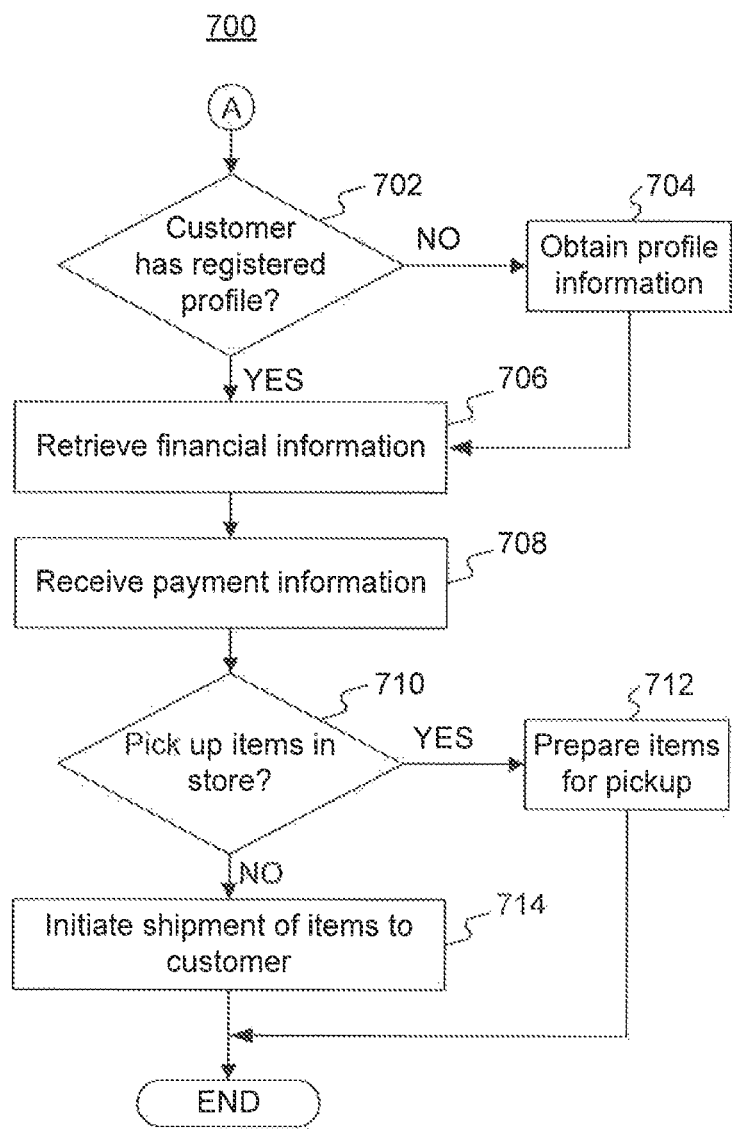
FIG. 7 shows an exemplary process of paying for and receiving merchandise items by completing the purchasing process in a store consistent with disclosed embodiments.

FIG. 7 is a flowchart of an exemplary process 700 that may be implemented for completing the purchase of one or more merchandise items 104. One or more steps of process 700 may be implemented on customer device 220, merchant system 212, and/or financial services system 232 with or without communications via network 240. The order and arrangement of steps in process 700 is provided for purposes of illustration. As will be appreciated from this disclosure, modifications may be made to process 700 by, for example, adding, combining, removing, and/or rearranging one or more steps of process 700. It is contemplated that in performing process 700, notifications, information, message, images, graphical user interface, etc. may be displayed on display 310 associated with customer device 220, merchant system 212, and/or financial services system 232. Further, it is contemplated that in performing process 700, customers 222 may make one or more selections or enter one or more items of information or data using I/O devices associated with customer device 220. In addition, it is contemplated that in performing process 700, information or data may be accessed, retrieved, or stored in memory 306, storage medium 308, and/or database 314 associated with one or more of sensor 214, merchant system 212, customer device 220, and/or financial services system 232.

Process 700 may include a step 702 of determining whether customer 222 has a registered profile. A profile may include one or more items of information, for example, a name, an identifier, a billing address, one or more shipping addresses, financial information, etc. associated with customer 222. Financial information included in the profile may include information regarding at least one of a bank account, a credit card account, a debit card account, a rewards or gift card account, etc., serviced by one or more financial services systems 232 and associated with customer 222. Financial information may also include information to authenticate any of these accounts using, for example, a username, an account number, a personal identification number (PIN), a password, etc., which may allow system 200 to determine whether the bank account, credit card account, debit card account, rewards or gift card account, etc., is associated with customer 222. Customer 222 may be deemed to have a registered profile when a profile associated with customer 222 is stored in memory 306, storage medium 308, or database 314 associated with customer device 220, merchant system 212, and/or financial services system 232.

When it is determined in step 702 that customer 222 does not have a registered profile (Step 702: NO), process 700 may proceed to step 704 of obtaining profile information. Obtaining profile information may include displaying a notification requesting customer 222 to provide, for example, a name, a billing address, one or more shipping addresses, financial information, authentication information etc. Customer 222 may be notified by performing notification processes similar to those discussed in connection with, for example, step 616 of process 600. Customer 222 may use one or more I/O devices 304 and/or GUI elements similar to those discussed, for example, in connection with GUI 500 to provide the requested profile information. Obtaining profile information may include storing the received profile information in memory 306, storage medium 308, and/or database 314 as a registered profile associated with customer 222.

Returning to step 702, when it is determined in step 702 that customer 222 has a registered profile (Step 702: YES), process 700 may proceed to step 706 of retrieving financial information. Retrieving financial information may include accessing financial information associated with customer 222 and stored in a registered profile of customer 222 from memory 306, storage medium 308, and/or database 314 associated with merchant system 212, customer device 220, and/or financial services system 232. In some exemplary embodiments, retrieving financial information may include a step of authenticating the financial information associated with customer 222. For example, merchant system 212 and/or financial services system 232 may send customer 222 a notification requesting the customer to enter a PIN, a password, and/or a verification code, etc. Merchant system 212 and/or financial services system 232 may send the notification by performing notification processes similar to those discussed in connection with, for example, step 616 of process 600. The verification code may be sent to customer 222 via electronic mail, text message, SMS message etc., and/or by performing notification processes similar to those discussed, for example, in connection with step 616 of process 600. Customer 222 may use one or more I/O devices 304 and/or GUI elements similar to those discussed, for example, in connection with GUI 500 to enter the PIN, password, and/or verification code. Merchant system 212 and/or financial services system 232 may compare the PIN, password, and/or verification code provided by customer 222 to corresponding information stored in association with customer 222 in memory 306, storage medium 308, and/or database 314. When the PIN, password, and/or verification code provided by customer 222 matches the corresponding information stored in association with customer 222, process 700 may proceed to step 708. When the PIN, password, and/or verification code provided by customer 222 does not match the corresponding information stored in association with customer 222, however, merchant system 212 and/or financial services system 232 may notify customer 222 that the PIN, password, and/or verification code provided by customer 222 is not valid. Merchant system 212 and/or financial services system 232 may notify customer 222 by performing processes similar to those discussed in connection with, for example, step 616 of process 600.

As further illustrated in FIG. 7, process 700 may also include a step 708 of receiving payment information. Receiving payment information may include receiving information associated with debiting one or more of a bank account, credit card account, debit card account, rewards account, gift cart account etc. associated with customer 222 with an amount of money corresponding to a purchase price of merchandise items 104 in the shopping cart. Customer 222 may also receive (via, e.g., customer device 220) a notification that the purchase price of merchandise items 104 has been debited from one or more of a bank account, credit card account, debit card account, rewards account, gift cart account etc. associated with customer 222. Merchant system 212 and/or financial services system 232 may notify customer 222 by performing processes similar to those discussed in connection with, for example, step 616 of process 600.

As further illustrated in FIG. 7, process 700 may also include step 710 of determining whether customer 222 wants to pick up the purchased merchandise items 104 in store 100. The determination may be made, for example, based on input provided by customer 222 via customer device 220. When it is determined in step 710 that customer 222 wants to pick up the purchased merchandise items 104 in store 100 (Step 710: YES), process 700 may proceed to step 712 of preparing merchandise items 104 for pickup. Preparing merchandise items for pickup may include retrieving merchandise items 104 from aisle 102 and/or from another storage location in store 100 and placing merchandise items 104 at a delivery location in store 100 to allow customer 222 to pick up the merchandise items 104 from store 100. In some exemplary embodiments, preparing merchandise items for pickup may include retrieving merchandise items 104 from a second store 100 associated with first store 100.

When it is determined in step 710, however, that customer 222 does not want to pick up the purchased merchandise items 104 in store 10 (Step 710: NO), process 700 may proceed to step 714 of initiating shipment of the purchased merchandise items 104 to an address associated with customer 222. Initiating shipment of the purchased merchandise items 104 in step 714 may include displaying the one or more shipping addresses listed in a registered profile associated with customer 222 on display 310 and requesting customer 222 to make a selection of one or more addresses. Displaying the one or more addresses may include performing processes for notifying customer 222 similar to those discussed in connection with, for example, step 616 of process 600. Customer 222 may select one or more addresses using one or more I/O devices 304 and/or GUI elements similar to those discussed, for example, in connection with GUI 500. Shipping the purchased merchandise items 104, in step 714, may include shipping merchandise items 104 to the one or more addresses selected by customer 222.

Figure 8:
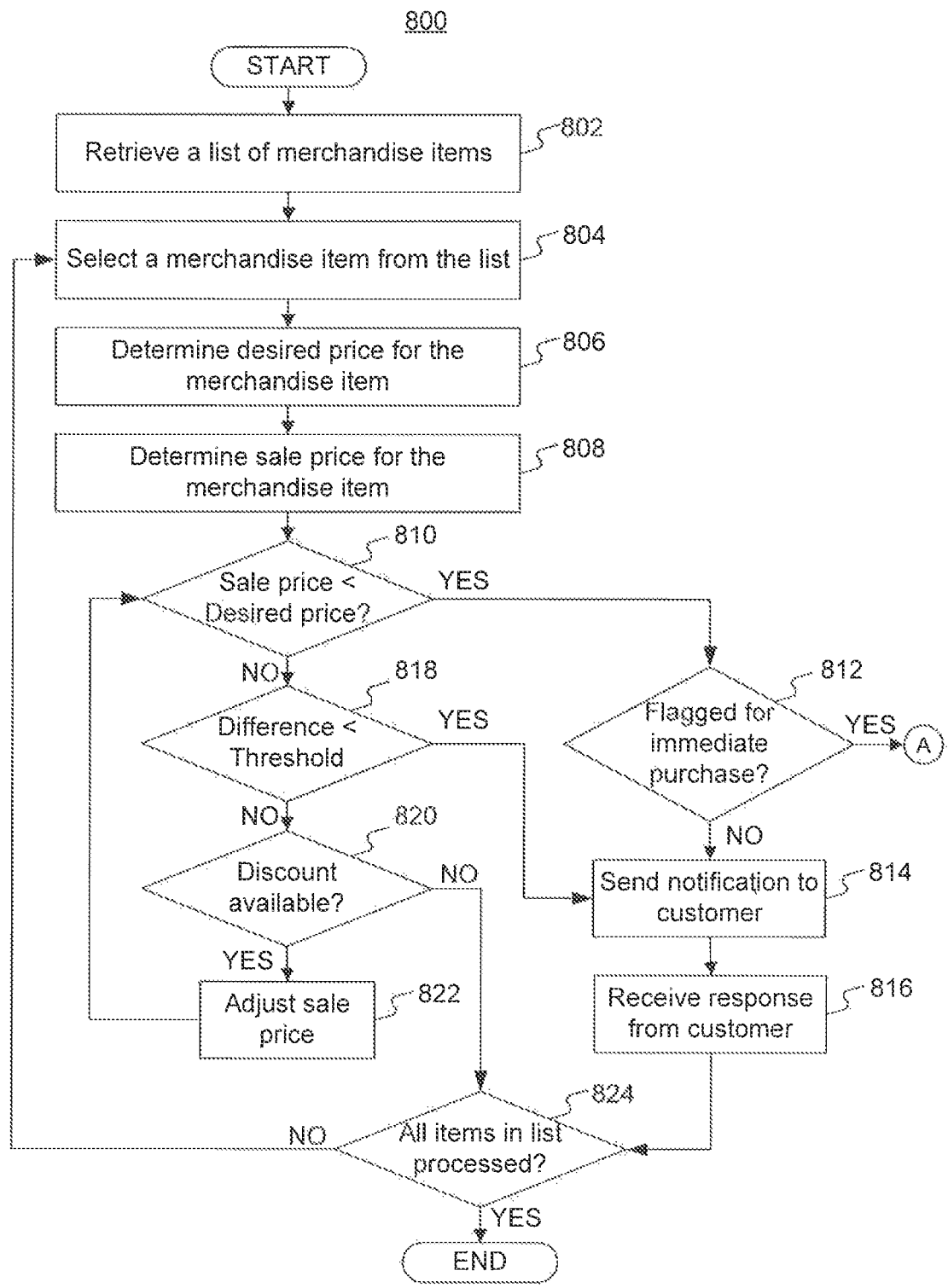
FIG. 8 shows an exemplary process of completing sale of a merchandise item based on the desired purchase price specified by a customer consistent with disclosed embodiments.

FIG. 8 is a flowchart of an exemplary process 800 that may be implemented for completing the sale of merchandise items 104 to customer 222. Process 800 may be implemented on merchant system 212 with or without communications via network 240. The order and arrangement of steps in process 800 is provided for purposes of illustration. As will be appreciated from this disclosure, modifications may be made to process 800 by, for example, adding, combining, removing, and/or rearranging one or more steps of process 800. It is contemplated that in performing process 800, notifications, information, message, images, graphical user interface, etc. may be displayed on display 310 associated with merchant system 212 and/or customer device 220. Further, it is contemplated that in performing process 800, customer 222 may make one or more selections or enter one or more items of information or data using I/O devices 304 associated with customer device 220. In addition it is contemplated that in performing process 800, information or data may be accessed, retrieved, or stored in memory 306, storage medium 308, and/or database 314 associated with one or more of sensor 214, merchant system 212, customer device 220, and/or financial services system 232.

Process 800 may include a step 802 of retrieving a list of merchandise items 104 previously selected by customer 222. For example, customer 222 may have selected merchandise items 104 for which the purchase process has not yet been completed. Customer 222 may for example, have selected merchandise items 104 for purchase during a previous visit to store 100. Alternatively, customer 222 may have selected merchandise items 104 for purchase through an online shopping system or web site. Regardless, merchant system 212 may retrieve the list of merchandise items 104 from memory 306, storage medium 308, and/or database 314.

As further illustrated in FIG. 8, process 800 may include a step 804 of selecting a merchandise item 104 from the list of merchandise items 104 retrieved in, for example, step 802. Process 800 may also include as step 806 of determining a desired purchase price for the selected merchandise item 104. Merchant system 212 may retrieve the desired purchase price from memory 306, storage medium 308, and/or database 314, where the desired purchase price may be stored in association with a customer identifier for customer 222.

As further illustrated in FIG. 8, process 800 may include a step 808 of determining a purchase price for the selected merchandise item 104. Merchant system 212 may determine the purchase price from inventory information associated with merchandise item 104 stored in memory 306, storage medium 308, and/or database 314. Inventory information may include a quantity of merchandise item 104 available with merchant 210 and/or in store 100, a current purchase price for merchandise item 104, and other information indicating discounts, price reductions, and/or price increases associated with merchandise item 104.

As further illustrated in FIG. 8, process 800 may include a step 810 of determining whether the purchase price is less than or equal to the desired purchase price. When it is determined in step 810 that the purchase price is less than or equal to the desired purchase price (Step 810: YES), process 800 may proceed to step 812 of determining whether merchandise item 104 has been flagged for immediate purchase. Determining whether merchandise item 104 has been flagged for immediate purchase may include accessing the purchase preference flag stored in association with customer identifier for customer 222 and merchandise item 104 from memory 306, storage medium 308, and/or database 314. When it is determined in step 812 that merchandise item 104 has been flagged for immediate purchase (Step 812: YES), process 800 may proceed to step A discussed above in connection with, for example, process 700. When it is determined in step 812 that merchandise item 104 has not been flagged for immediate purchase (Step 812: NO), process 800 may proceed to step 814 of sending a notification to customer 222 that the purchase price of merchandise item 104 is less than or equal to the desired purchase price specified by customer 222 for that merchandise item 104. Notifying customer 222 may include requesting customer 222 to indicate whether customer 222 wishes to purchase merchandise item 104 at the purchase price. Merchant system 212 may notify customer 222 by performing processes similar to those discussed in connection with, for example, step 616 of process 600. Customer 222 may respond to the notification sent by merchant system 210 by performing processes, which are discussed below in connection with process 900. Process 800 may include step 816 of receiving a response from customer 222 after which process 800 may proceed to step 824. It is also contemplated that customer 222 may not provide a response to the notification.

Returning to step 810, when it is determined in step 810 that the purchase price is greater than the desired purchase price (Step 810: NO), process 800 may proceed to step 818 of determining whether a difference between the purchase price and the desired purchase price is less than a threshold. The difference between the purchase price and the desired purchase price may be determined by subtracting the desired purchase price from the purchase price. In one exemplary embodiment, the difference may be determined as a percentage of the desired purchase price. In some exemplary embodiments, the threshold may be specified as a value in any currency known in the art. For example, the threshold may be specified as about $10.00 (ten dollars and zero cents). In other exemplary embodiments, the threshold may be specified as a percentage of the desired purchase price. For example, the threshold may be specified as within 5% of the desired purchase price. In yet other exemplary embodiments, the threshold may have different values for different ranges of desired purchase price. For example the threshold may be within 2% of the desired purchase price when the desired purchase price ranges between $0 and $100 and within 5% when the desired purchase price ranges from $101 to $1000.

When it is determined in step 818 that the difference is less than the threshold (Step 818: YES), process 800 may proceed to step 814 of sending a notification to customer 222 that the difference between the purchase price and the desired purchase price is below the threshold. Customer 222 may respond to the notification by performing processes, which are discussed below in connection with process 900. Process 800 may include step 816 of receiving a response from customer 222 after which process 800 may proceed to step 824. It is also contemplated that customer 222 may not provide a response to the notification in which case process 800 may proceed to step 824 from step 814.

Returning to step 818, when it is determined in step 818 that the difference between the purchase price and the desired purchase price is greater than the threshold (Step 816: NO), process 800 may proceed to step 820 of determining whether any discount is available. Merchant system 212 may determine whether any discount is available by retrieving inventory information for merchandise item 104 from memory 306, storage medium 308, and/or database 314. When it is determined in step 820 that a discount is not available (Step 820: NO), process 800 may proceed to step 824. When it is determined in step 820, however, that a discount is available (Step 820: YES), process 800 may proceed to step 822 of adjusting the purchase price based on the discount. In some exemplary embodiments, the discount may be specified as a numeric value in any currency known in the art. In these embodiments, the purchase price may be adjusted by subtracting the specified discount from the current purchase price. In other exemplary embodiments the discount may be specified as a percentage. In these embodiments, the purchase price may be adjusted by scaling the purchase price using the discount percentage. In yet other exemplary embodiments, the discount may be in the form of a credit to financial accounts associated with customer 222 or in the form of a gift or reward card, which customer 222 may use to make a future purchase. After adjusting the purchase price in step 822, process 800 may return to step 810.

As further illustrated in FIG. 8, process 800 may include a step 824 of determining whether all merchandise items 104 in the list of items obtained in, for example, step 802 have been processed. When it is determined in step 824 that all merchandise items 104 have not been processed (Step 824: NO), process 800 may return to step 804. When it is determined in step 824, however, that all merchandise items 104 have been processed (Step 822: YES), process 800 may end.

Figure 9:
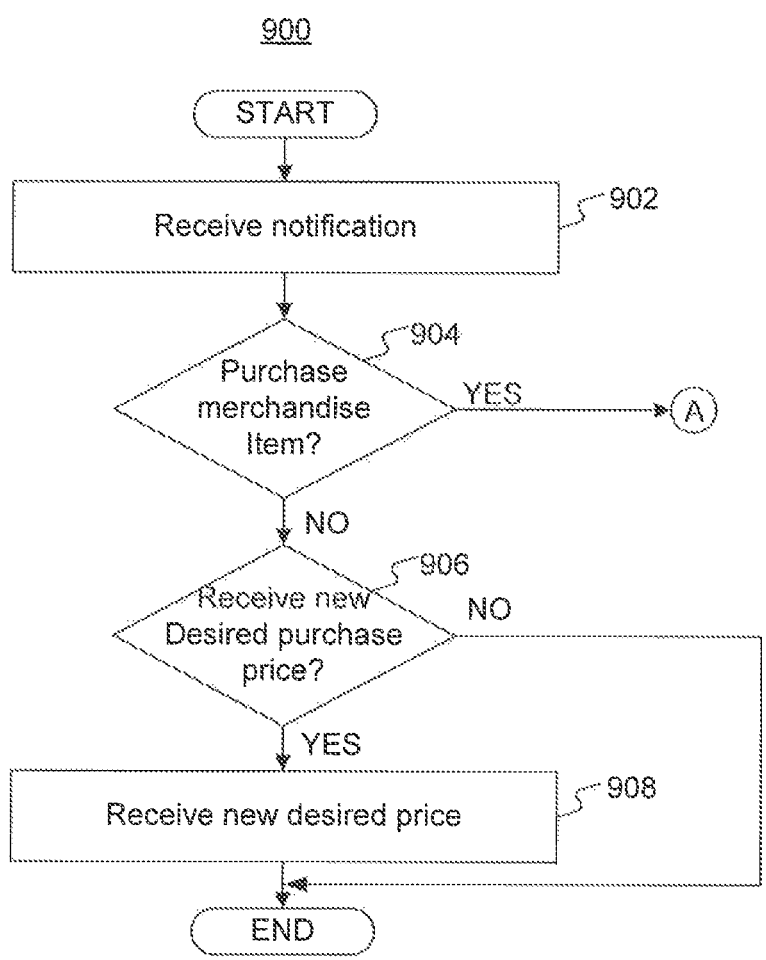
FIG. 9 is a flowchart of an exemplary process for responding to a notification received by a customer regarding the purchase price of a merchandise item consistent with disclosed embodiments.

FIG. 9 is a flowchart of an exemplary process 900 that may be implemented for responding to a notification received by customer 222 regarding the purchase price of a merchandise item 104. Process 900 may be implemented using merchant system 212 and customer device 220 with communication via network 240. The order and arrangement of steps in process 900 is provided for purposes of illustration. As will be appreciated from this disclosure, modifications may be made to process 900 by, for example, adding, combining, removing, and/or rearranging one or more steps of process 900. It is contemplated that in performing process 900, notifications, information, message, images, graphical user interface, etc. may be displayed on display 310 associated with merchant system 212 and/or customer device 220. Further, it is contemplated that in performing process 900, customer 222 may make one or more selections or enter one or more items of information or data using I/O devices 304 associated with customer device 220. In addition, it is contemplated that in performing process 900, information or data may be accessed, retrieved, or stored in memory 306, storage medium 308, and/or database 314 associated with one or more of sensor 214, merchant system 212, customer device 220, and/or financial services system 232.

As further illustrated in FIG. 9, process 900 may include a step 902 of receiving a notification. In some exemplary embodiments, the notification may indicate that a purchase price of merchandise item is greater than the desired purchase price specified by customer 222. In other exemplary embodiments, the notification may indicate that the difference between the purchase price and the desired purchase price of merchandise item 104 is above a threshold.

As further illustrated in FIG. 9, process 900 may include a step 904 of determining whether customer 222 wants to purchase merchandise item 104 at the purchase price. Customer 222 may indicate whether customer 222 wants to purchase merchandise item 104 using one or more I/O devices 304 by manipulating one or more GUI elements discussed in connection with, for example, GUI 500. For example, customer 222 may respond to the notification by sending an electronic communication, for example, electronic mail, text message, SMS message, etc. to merchant 210. In other exemplary embodiments, customer 222 may respond to the notification by sending a facsimile or by mail. In yet other exemplary embodiments, customer 222 may respond to the notification by calling merchant 210 and speaking with a customer services representative associated with merchant 210. When it is determined in step 904 that customer 222 wants to purchase merchandise item 104 (Step 904: YES), process 900 may proceed to step A of, for example, process 700 to complete purchase of the merchandise item at the purchase price.

When it is determined in step 904, however, that customer 222 does not want to purchase merchandise item 104 (Step 904: YES), process 900 may proceed to step 906 of determining whether customer 222 wants to specify a new desired purchase price. When it is determined in step 906 that customer 222 does not want to specify a new desired purchase price for merchandise item 104 (Step 904: NO), process 900 may end. When it is determined in step 906, however, that customer 222 wants to specify a new desired purchase price for merchandise item 104 (Step 904: NO), process 900 may proceed to step 908 of receiving a new desired purchase price for merchandise item 104. Customer 222 may provide a new desired purchase price for merchandise item 104 using processes similar to those discussed in connection with step 904. The new desired purchase price may be higher or lower than the desired purchase price of merchandise item 104 previously specified by customer 222.

Other embodiments of the disclosure will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A method for facilitating one or more item transactions, comprising:
   determining a location of a user device in a store based on signals transmitted between the user device and a physical sensor located in the store, the physical sensor being associated with a sensor identifier;
   receiving, via the physical sensor, information indicating items located within a first distance from the location of the user device, the physical sensor obtaining the information from a database storing sensor position data associated with the sensor identifier and distances between the items and the physical sensor within the store, the first distance comprising a predetermined threshold distance;
transmitting, via the physical sensor, for display on a graphical user interface on the user device, a list of items located within the first distance from the location of the user device;
receiving, from the user device, a selection of an item and one or more price criteria for the item;
determining that a price for the item satisfies the one or more price criteria; and
based on the price satisfying the one or more price criteria, performing at least one of:
 initiating a transaction associated with of the item; or
 transmitting a notification to the user device.

2. The method of claim 1, wherein the one or more price criteria being satisfied comprises the price for the item being less than or equal to a desired price for the item.

3. The method of claim 2, wherein determining that the price for the item satisfies the one or more price criteria comprises:
determining a base price for the item;
identifying a discount for the item;
determining a discounted price for the item based at least on the discount; and
determining that the discounted price is less than or equal to the desired price.

4. The method of claim 3, wherein identifying the discount includes retrieving inventory information for the item.

5. The method of claim 1, further comprising:
receiving, from the user device, an update to the one or more price criteria for the item; and
updating the one or more price criteria based on the update to the one or more price criteria.

6. The method of claim 1, further comprising receiving, in response to the notification, an indication that a user associated with the user device would like to purchase the item.

7. The method of claim 6, further comprising:
receiving shipment information in response to the notification; and
initiating delivery of the item based on the shipment information.

8. The method of claim 6, further comprising:
receiving, from the user device, financial information associated with the user device; and
authenticating the financial information associated with the user device.

9. The method of claim 1, further comprising:
receiving, from the user device, a request to identify additional items located within a second distance of the user device; and
identifying, in response to the request, one or more items located within the second distance, wherein the one or more items include the selected item.

10. The method of claim 9, wherein identifying the one or more items located within the second distance includes adding a third distance to the first distance to determine the second distance.

11. The method of claim 1, further comprising storing an identifier associated with the selected item in association with a user identifier associated with the user device.

12. A system, comprising:
a physical sensor, the physical sensor being associated with a sensor identifier;
memory storing instructions, and
at least one processor configured to execute the instructions to perform operations comprising:
determining a location of a user device based on signals transmitted between the user device and the physical sensor;
receiving, via the physical sensor, information indicating items located within a first distance from the determined location of the user device, the physical sensor obtaining the information from a database storing sensor position data associated with the sensor identifier and inventory information;
transmitting, by the physical sensor for display on a graphical user interface on the user device, a list of items located within the first distance from the determined location of the user device;
receiving, from the user device, a selection of an item and one or more price criteria for the item;
determining that a price for the item satisfies the one or more price criteria; and
based on the determination that the price satisfies the one or more price criteria for the item, performing at least one of:
 initiating a transaction associated with the item; or
 transmitting a notification to the user device.

13. The system of claim 12, wherein determining the price satisfies the one or more price criteria comprises:
determining a base price for the item;
identifying a discount for the item;
determining a discounted price for the item based at least on the discount; and
determining that the discounted price is less than or equal to a desired price for the item.

14. The system of claim 12, wherein the operations further comprise:
receiving, from the user device, an update to the one or more price criteria for the item; and
updating the one or more price criteria based on the update.

15. The system of claim 12, wherein the operations further comprise:
receiving, from the user device, a request to identify additional items located within a second distance of the user device; and
identifying, in response to the request, one or more items located within the second distance, wherein the one or more items include the selected item.

16. The system of claim 12, wherein the operations further comprise storing an identifier associated with the item in association with a user identifier associated with the user device.

17. One or more non-transitory computer-readable media storing instructions that, when executed by one or more processors, cause operations comprising:
determining a location of a user device in a store based on signals transmitted between the user device and a physical sensor located in the store, the physical sensor being associated with a sensor identifier;
receiving, via the physical sensor, information indicating items located within a first distance from the location of the user device, the physical sensor obtaining the information from a database storing sensor position data associated with the sensor identifier and distances between the items and the physical sensor within the store, the first distance comprising a predetermined threshold distance;

transmitting, by the physical sensor, for display on a graphical user interface on the user device, a list of items located within the first distance from the location of the user device;

receiving, from the user device, a selection of an item and one or more price criteria for the item;

determining that a price for the item satisfies the one or more price criteria; and based on the price satisfying the one or more price criteria, performing at least one of:
  initiating a transaction associated with the item; or
  transmitting a notification to the user device.

18. The one or more non-transitory computer-readable media of claim 17, wherein the operations further comprise:

receiving, from the user device, a request to identify additional items located within a second distance from the user device; and identifying, in response to the request of the user device, one or more items located within the second distance, wherein the one or more items include the selected item.

19. The one or more non-transitory computer-readable media of claim 18, wherein identifying the one or more items located within the second distance includes adding a third distance to the first distance to determine the second distance.

20. The one or more non-transitory computer-readable media of claim 17, further comprising storing an identifier associated with the selected item in association with a user identifier associated with the user device.

* * * * *